(12) United States Patent
Kihara

(10) Patent No.: US 6,220,085 B1
(45) Date of Patent: Apr. 24, 2001

(54) VEHICLE-VELOCITY CALCULATING APPARATUS

(75) Inventor: Takaei Kihara, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 08/908,447

(22) Filed: Aug. 7, 1997

(30) Foreign Application Priority Data

Aug. 7, 1996 (JP) .................................................. 8-225865

(51) Int. Cl.$^7$ .................................................. G01P 15/00
(52) U.S. Cl. .................................................. 73/116; 701/110
(58) Field of Search .................................. 73/116, 117.2, 73/117.3, 118.1; 701/101, 102, 110, 1, 22, 31

(56) References Cited

U.S. PATENT DOCUMENTS

| | | | |
|---|---|---|---|
| 3,869,019 | * | 3/1975 | Cardani .................................. 180/105 |
| 4,811,232 | * | 3/1989 | Hoashi et al. .......................... 701/82 |
| 5,087,881 | * | 2/1992 | Peacock .................................. 73/117.3 |
| 5,951,614 | * | 9/1999 | Tabata et al. ........................... 701/54 |

FOREIGN PATENT DOCUMENTS

| | | |
|---|---|---|
| 408877 | 1/1991 | (EP) . |
| 472877 | 3/1992 | (EP) . |
| 701134 | 3/1996 | (EP) . |
| 758087 | 2/1997 | (EP) . |

OTHER PUBLICATIONS

*Patent Abstracts of Japan*, vol. 012, No. 231, Jun. 30, 1988 & JP 63 024166, Feb. 1, 1988.
*Patent Abstracts of Japan*, vol. 011, No. 278, Sep. 9, 1987 & JP 62–077803, Apr. 10, 1987.

* cited by examiner

*Primary Examiner*—George Dombroske
(74) *Attorney, Agent, or Firm*—Ostrolenk, Faber, Gerb & Soffen, LLP

(57) ABSTRACT

A vehicle-velocity calculating apparatus which is easy to mount on a vehicle and is free from the influence of the gravitational acceleration includes an input terminal end connectable to a cigarette lighter outlet provided in a vehicle. Connected to the input terminal end is the input terminal of a noise filter. A counter is coupled at its input terminal to the output terminal of the noise filter. Connected to the output terminal of the counter is the input terminal of a velocity calculating circuit. The velocity calculating circuit calculates, in accordance with an output signal from the counter, the operating velocity of a vehicle, which is proportional to the frequency of a pulsating component generated in the vehicle's generator. The output terminal of the velocity calculating circuit is connected to an output terminal end. The vehicle operating velocity is thus obtained from the output terminal end.

6 Claims, 4 Drawing Sheets

RELATIONSHIP BETWEEN
ACCELERATION AND
DIFFERENTIATED VALUE

VEHICLE-VELOCITY CALCULATING APPARATUS

BACKGROUND OF THE INVENTION

1. Field of the Invention

The present invention broadly relates to a vehicle-velocity calculating apparatus. More particularly, the invention relates to a vehicle-velocity calculating apparatus, for example, for obtaining velocity information required for performing positional calculation in a vehicle navigation system.

2. Description of the Related Art

In a conventional navigation system, the following type of vehicle-velocity calculating apparatus is available: an apparatus which uses a signal output from a vehicle-loaded velocity sensor so as to obtain velocity information required for performing positional calculation.

Another type of vehicle-velocity calculating apparatus is available in a known navigation system. An apparatus is provided with an acceleration sensor for detecting the acceleration of a vehicle traveling in a forward direction. The apparatus then integrates an output signal of the acceleration sensor with respect to time, thereby calculating the vehicle velocity.

However, signals cannot be readily extracted from the vehicle-loaded velocity sensor to the exterior, which inconveniently requires extra wiring work. Further, there is a difference in the method of outputting signals from the velocity sensor among the types of vehicles, and there may be some cases where signals cannot be extracted at all. Additionally, the following problem is encountered by a vehicle-velocity calculating apparatus which obtains the vehicle velocity by integrating a signal from the acceleration sensor with respect to time. If a vehicle travels downward, for example, on a slope, the integrated value representing the gravitational acceleration is disadvantageously output as the vehicle velocity.

SUMMARY OF THE INVENTION

Accordingly, it is a major object of the present invention to provide a vehicle-velocity calculating apparatus which is easily mounted on a vehicle, free from the influence of the gravitational acceleration.

In order to achieve the above object, according to one aspect of the present invention, there is provided a vehicle-velocity calculating apparatus comprising: a first means connectable to an output of a power line of a vehicle for obtaining a signal corresponding to a frequency or a period of a pulsating component generated in the vehicle's generator which appears at the output; and second means for obtaining a signal corresponding to an operating velocity of the vehicle in accordance with an output signal from the counter.

Preferably, the first means includes a counter and the second means includes a calculating circuit.

With this arrangement, in the above-described vehicle-velocity calculating apparatus, the counter measures the frequency or the period of a pulsating component contained in a power line, and outputs a signal representing the measured frequency or the period of the pulsating component. A pulsating component contained in the power line is generated in a generator (alternator). The frequency or the period of the pulsating component is proportional to the engine speed, and the engine speed is proportional to the vehicle running velocity. Namely, there is a proportional relationship between the vehicle running velocity and the frequency or the period of a pulsating component generated in a vehicle's generator. Based on this relationship, the calculation circuit calculates the vehicle operating velocity in accordance with an output signal from the counter.

Further, according to another aspect of the present invention, there is provided a vehicle-velocity calculating apparatus comprising: a counter connected to a vehicle power line via a noise filter, the counter being for obtaining a signal corresponding to a frequency or a period of a pulsating component generated in a vehicle's generator; a differentiating circuit for differentiating an output signal from the counter with respect to time; a calculating circuit for obtaining a signal corresponding to a provisionally determined acceleration in accordance with an output signal from the differentiating circuit; an acceleration sensor for obtaining a correction signal to correct the signal corresponding to the provisionally determined acceleration obtained by the calculating circuit; a correction circuit for correcting, based on the correction signal, the signal corresponding to the provisionally determined acceleration obtained by the calculating circuit; and an integrating circuit for integrating with respect to time the signal corresponding to the acceleration corrected by the correction circuit, thereby obtaining a signal corresponding to the operating velocity.

With this arrangement, in the above-described vehicle-velocity calculating apparatus, the counter determines the frequency or the period of a pulsating component contained in the power line, and outputs a signal indicating the determined frequency or the period. The output signal from the counter is differentiated with respect to time by the differentiating circuit. The differentiated signal output from the differentiating circuit is then input into the calculating circuit and is converted into a signal corresponding to a provisionally determined acceleration. The provisional acceleration signal may sometimes contain errors due to various circumstances, such as a change in the gear ratio caused by a shift change. In order to correct for the above errors, the acceleration sensor is provided to detect various circumstances, such as those where there occurs a sudden change in the acceleration caused by a shift change or a vehicle is moving backward. Based on a determination, the acceleration sensor outputs a correction signal for correcting the provisional acceleration signal. Based on this correction signal, the correction circuit corrects errors contained in the provisional acceleration signal and obtains a signal representing the correct acceleration. The correct acceleration signal is further integrated with respect to time by the integration circuit. As a consequence, a signal indicating the operating velocity can be obtained.

The vehicle-velocity calculating apparatus of the present invention is easy to mount on a vehicle without needing extra work because a cigarette lighter outlet or an audio power outlet which is provided in a vehicle may be used as a vehicle power line to connect the apparatus to the vehicle. Accordingly, the vehicle running velocity can be readily obtained by this apparatus. Moreover, the apparatus calculates the vehicle velocity through the use of a pulsating component contained in the power line, thus being free from an influence of the gravitational acceleration. Additionally, power supplied from the vehicle power line may be used as operating power, thereby enhancing the simplicity of the apparatus.

The above and other objects, features, and advantages of the invention will become more apparent from the following detailed description of embodiments in conjunction with the accompanying drawings.

DESCRIPTION OF THE PREFERRED EMBODIMENTS

Figure 1:
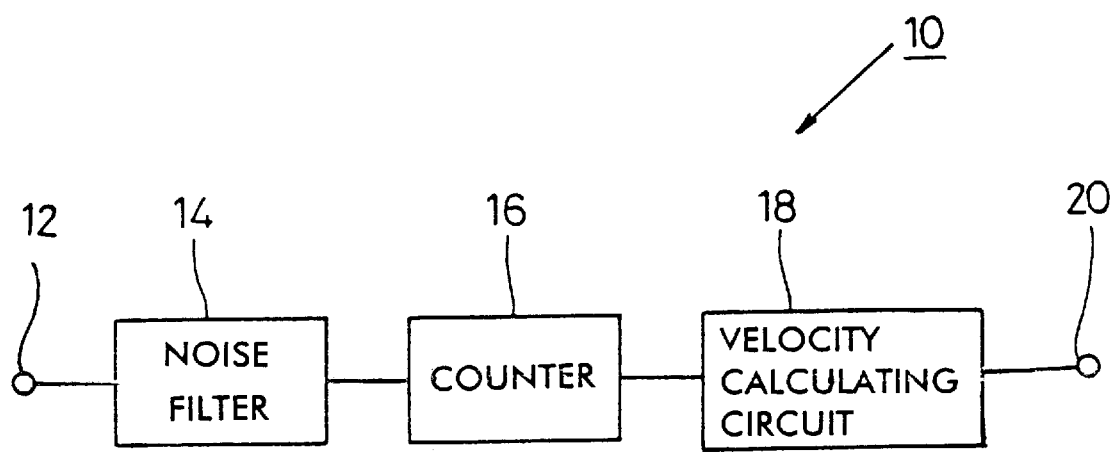
FIG. 1 is a block diagram illustrating an embodiment of the present invention.
Figure 2:
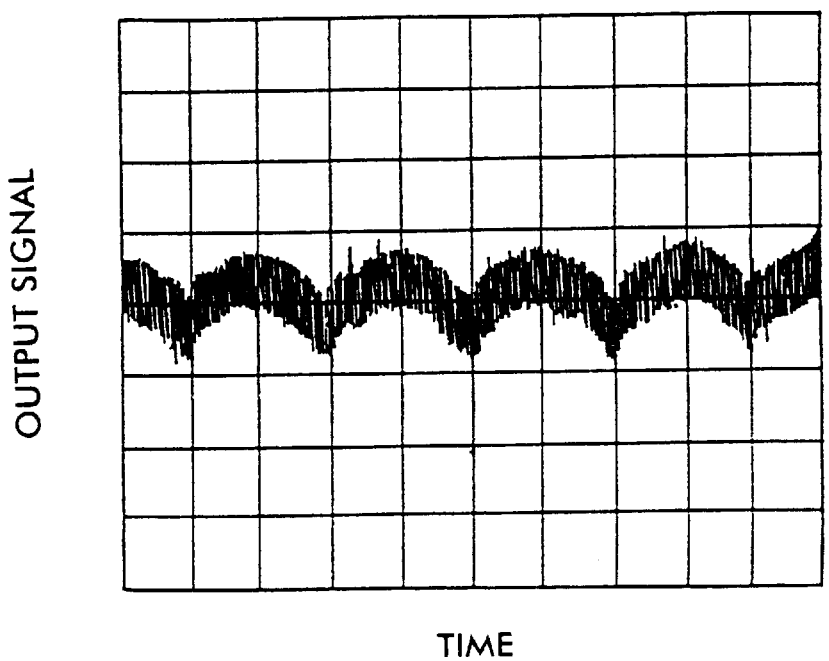
FIG. 2 is a waveform diagram of a signal obtained from a power line when the engine speed is 700 rpm.
Figure 3:
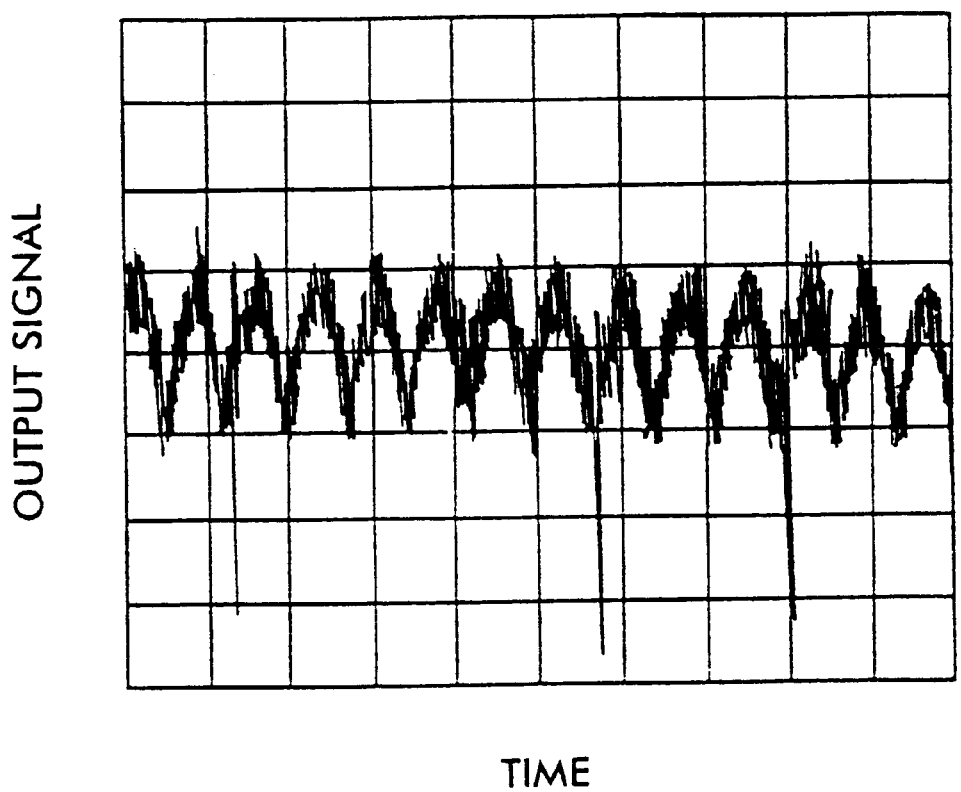
FIG. 3 is a waveform diagram of a signal obtained from a power line when the engine speed is 2000 rpm.

Referring to a block diagram of FIG. 1, a vehicle-velocity calculating apparatus 10 constructed in accordance with an embodiment of the present invention includes an input terminal end 12. The input terminal end 12 used in this embodiment is formed to be connectable to a cigarette lighter outlet, which serves as a power line used in a vehicle. The velocity calculating apparatus 10 obtains from the cigarette lighter outlet not only a pulsating component contained in the vehicle power line, but also operating power. The pulsating component contained in the power line is generated in a generator (alternator), and the relationship of the frequency or the period of the pulsating component to the engine speed is proportional. FIGS. 2 and 3 are waveform diagrams respectively illustrating the signals output from the power line when the vehicle engine speeds are 700 rpm and 2000 rpm, respectively. The input terminal end 12 may be connectable to a vehicle audio power line outlet, as well as a cigarette lighter outlet.

Connected to the input terminal end 12 is the input terminal of a noise filter 14, which serves to suppress noise other than the pulsating component. A counter 16 is further coupled at its input terminal to the output terminal of the noise filter 14. The counter 16 used in this embodiment measures the frequency of the pulsating component contained in the vehicle power line and performs sampling on the measured frequency. Then, an analog or digital signal in accordance with the frequency of the pulsating component is output from the counter 16.

Connected to the output terminal of the counter 16 is the input terminal of a velocity calculating circuit 18. The velocity calculating circuit 18 calculates, based on an output signal of the counter 16, the vehicle running velocity which is proportional to the frequency of the pulsating component. The transformation function and coefficient used for this velocity calculation are preset in the velocity calculating circuit 18. The output terminal of the velocity calculating circuit 18 is further connected to an output terminal end 20 from which a signal corresponding to the running velocity is output. A device through which the calculated vehicle velocity is output is connected to the output terminal end 20. It should be noted that the period rather than the frequency of the pulsating component may be measured in the counter 16.

According to this embodiment, the vehicle-velocity calculating apparatus 10 is connectable to a power line via, for example, a cigarette lighter outlet, so as to easily determine the operating velocity of a vehicle. Thus, the apparatus 10 can be easily mounted on a vehicle without needing extra wiring work. Moreover, since the apparatus 10 calculates the vehicle velocity by utilizing the pulsating component contained in a power line, it is unaffected by the gravitational acceleration. Additionally, the apparatus 10 is able to use the output from the vehicle generator as operating power, thereby enhancing the simplicity of the apparatus 10.

Referring to a block diagram shown in FIG. 4, a vehicle-velocity calculating apparatus 10 constructed in accordance with another embodiment of the present invention will now be explained. The apparatus 10 includes an input terminal end 12. The input terminal end 12 used in this embodiment is adapted to be connectable to a cigarette lighter outlet, which serves as a power line used in a vehicle. Accordingly, the apparatus 10 is able to obtain from the cigarette lighter output operating power, as well as a pulsating component contained in the vehicle power line. The input terminal 12 may be connectable to not only a cigarette lighter outlet, but also a vehicle audio power outlet.

Connected to the input terminal end 12 is the input terminal of a noise filter 14, which serves to suppress noise other than the pulsating components, such as those indicated in FIGS. 2 and 3. A counter 16 is further coupled at its input terminal to the output terminal of the noise filter 14. The counter 16 used in this embodiment measures the frequency of a pulsating component contained in the vehicle power line and performs sampling on the measured frequency. Then, an analog or digital signal in accordance with the frequency of the pulsating component is output from the counter 16.

The output terminal of the counter 16 is coupled to the input terminal of a differentiating circuit 22. The differentiating circuit 22 differentiates with respect to time an analog or digital signal representing the frequency of the pulsating component so as to transform it into a differentiated signal related to the provisionally determined acceleration (Hz/s). Connected to the output terminal of the differentiating circuit 22 is the input terminal of an acceleration calculating circuit 24.

Figure 5:
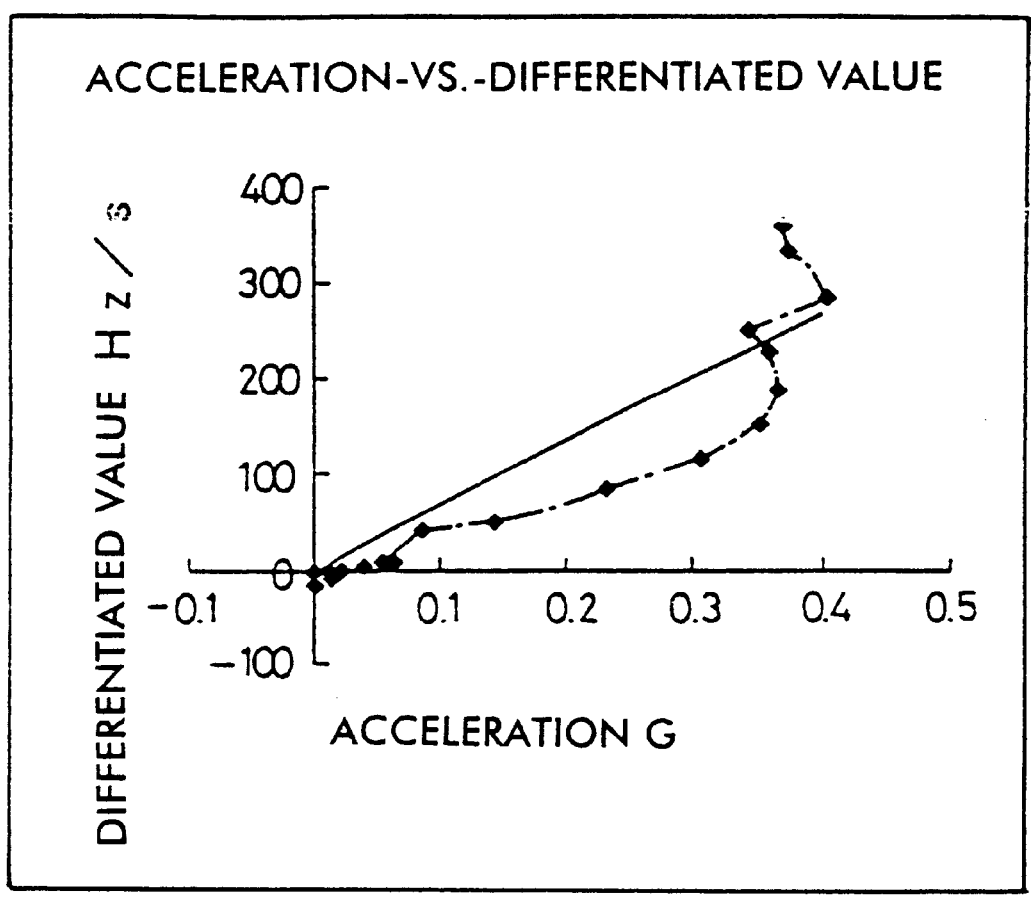
FIG. 5 is a diagram illustrating the relationship between the acceleration (G) and the differentiated value (Hz/s) of the frequency of a pulsating component.
Figure 5:
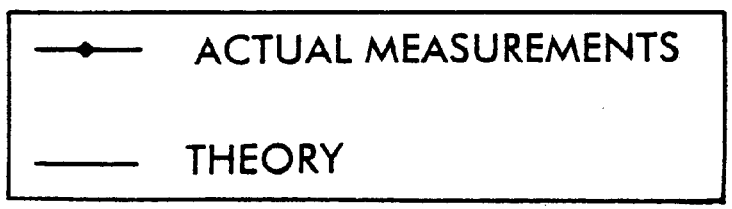

The acceleration calculating circuit 24 transforms the differentiated signal output from the differentiating circuit 22 into a signal representing the provisional acceleration. Namely, the relationship between the acceleration (G) applied to a vehicle body and the differentiated frequency (Hz/s) of the pulsating component can be indicated by, for example, FIG. 5. In FIG. 5, the one-dot-chain line represents a line formed by connecting actual measurements, while the solid line designates a line of theoretical values obtained from the actual measurements according to the method of least squares. In this manner, the transformation function and coefficient are predetermined according to the method of least squares in this embodiment, whereby the differentiated frequency (Hz/s) of the pulsating component is transformed into a signal corresponding to the acceleration (G) applied to a vehicle body which is provisionally determined. Throughout the specification, the term "provisionally determined acceleration" or "provisional acceleration" means a calculated acceleration before it is corrected by a correction circuit, which will be described in greater detail below.

The output terminal of the acceleration calculating circuit 24 is connected to one input terminal of a correction circuit 26. The correction circuit 26 corrects a signal representing the provisional acceleration which is output from the acceleration calculating circuit 24. More specifically, the foregoing transformation coefficient obtained by using the method of least squares needs to be altered depending on the various circumstances, for example, a change in the gear ratio due to a shift change or a vehicle running situation, such as the one in which a vehicle is moving backward. In order to meet this requirement, an acceleration sensor 28 for detecting the acceleration of a vehicle traveling in a forward direction is provided in this embodiment. By virtue of the acceleration sensor 28, sharp changes in the acceleration caused by a shift change or a vehicle's movement in a backward direction can be detected. An output signal of the acceleration sensor 28 is input as a correction signal into the other input terminal of the correction circuit 26. Based on this correction signal, the correction circuit 26 judges various situations, such as whether a shift change is made or a vehicle is running backward, and then selects a suitable coefficient in consideration of the above circumstances. The circuit 26 then corrects the signal indicating the provisional acceleration according to the selected coefficient, and outputs the corrected signal.

An integrating circuit 30 is further coupled at its input terminal to the output terminal of the correction circuit 26. The integrating circuit 30 integrates the signal representing the corrected acceleration with respect to time, thereby obtaining a signal corresponding to the vehicle operating velocity. The output terminal of the integrating circuit 30 is further connected to an output terminal end 20. Connected to the output terminal end 20 is a device for outputting the calculated vehicle velocity. In this embodiment, as well as in the previous embodiment, the period rather than the frequency of the pulsating component may be measured by the counter 16.

Figure 4:
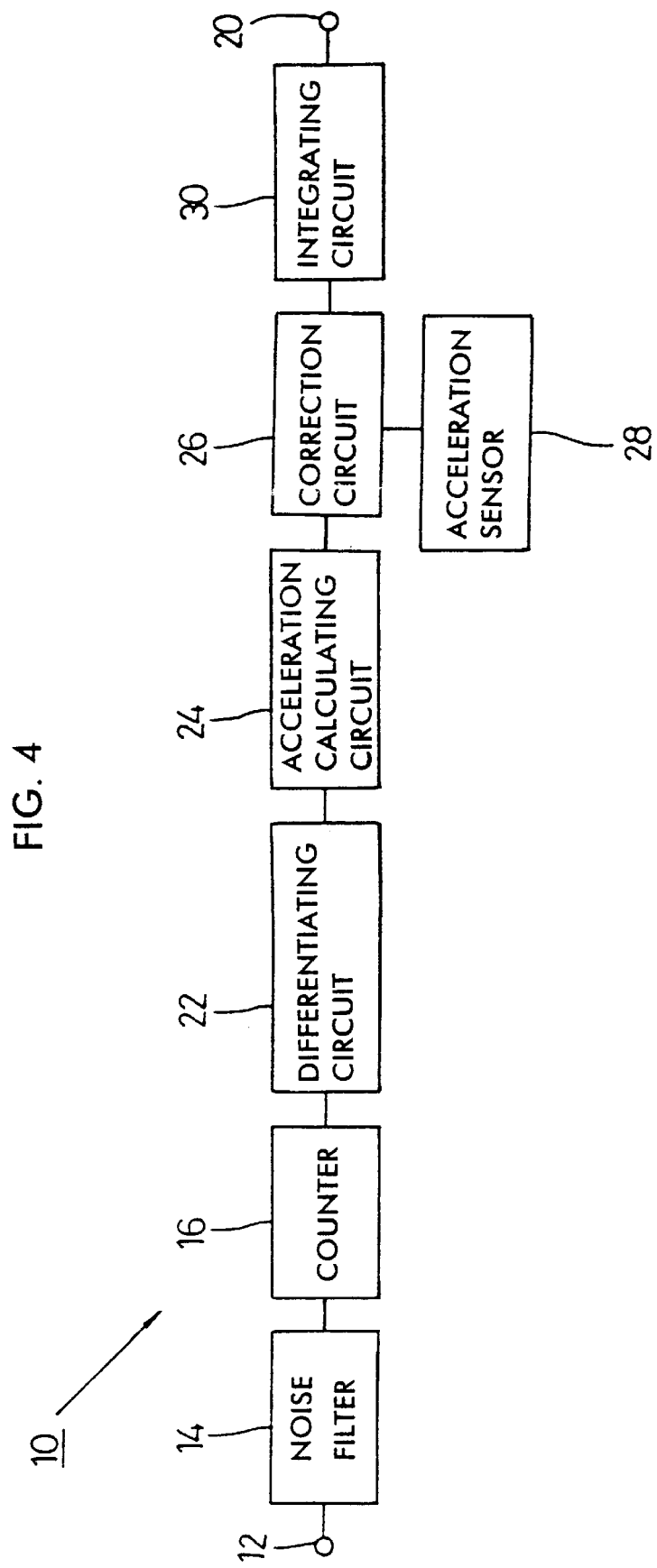
FIG. 4 is a block diagram illustrating another embodiment of the present invention.

The vehicle-velocity calculating apparatus 10 shown in FIG. 4 offers advantages similar to those exerted by the embodiment illustrated in FIG. 1. Further, in this embodiment, the provision of the correction circuit 26 makes it possible to obtain an even hiqher-precision running velocity.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vehicle-velocity calculating apparatus, comprising:
   first means connectable to an output of a power line of a vehicle for obtaining a signal corresponding to a frequency or period of a pulsating component generated in said vehicle's generator which appears at said output, said first means including a counter; and
   second means for obtaining from an output signal of said first means a signal corresponding to an operating velocity of said vehicle, said second means including a differentiating circuit for differentiating an output signal from said counter with respect to time.

2. A vehicle-velocity calculating apparatus according to claim 1, wherein the first means includes a noise filter coupled to said output of said power line and said counter is coupled to an output of said noise filter.

3. A vehicle-velocity calculating apparatus according to claim 1, wherein said second means includes;
   a calculating circuit for obtaining a signal corresponding to a provisionally determined acceleration in accordance with an output signal from said differentiating circuit.

4. A vehicle-velocity calculating apparatus according to claim 3, wherein said second means further includes:
   an acceleration sensor for obtaining a correction signal to correct the signal corresponding to the provisionally determined acceleration obtained by said calculating circuit; and
   a correction circuit for correcting, based on said connection signal, the signal corresponding to the provisionally determined acceleration obtained by said calculating circuit.

5. A vehicle-velocity calculating circuit according to claim 4, wherein said second means further includes:
   an integrating circuit for integrating with respect to time the signal corresponding to the acceleration corrected by said correction circuit, thereby obtaining a signal corresponding to the operating velocity.

6. A vehicle-velocity calculating apparatus comprising:
   a noise filter connectable to an output of a power line of a vehicle;
   a counter connected to said noise filter for obtaining a signal corresponding to a frequency or a period of a pulsating component generated in said vehicle's generator which appears at said output;
   a differentiating circuit for differentiating an output signal from said counter with respect to time;
   a calculating circuit for obtaining a signal corresponding to a provisionally determined acceleration of said vehicle in accordance with an output signal from said differentiating circuit;
   an acceleration sensor for obtaining a correction signal to correct the signal corresponding to the provisionally determined acceleration obtained by said calculating circuit;
   a correction circuit for correcting, based on said correction signal, the signal corresponding to the provisionally determined acceleration obtained by said calculating circuit; and
   an integrating circuit for integrating with respect to time the signal corresponding to the acceleration corrected by said correction circuit, thereby obtaining a signal corresponding to an operating velocity of said vehicle.

* * * * *